US006356053B1

(12) United States Patent
Sandoz et al.

(10) Patent No.: US 6,356,053 B1
(45) Date of Patent: Mar. 12, 2002

(54) CHARGING MECHANISM FOR CORDLESS TELEPHONE AND OTHER ELECTRICAL DEVICES

(75) Inventors: James D. Sandoz, Keyport; Chaonong Yoh, Matawan, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/401,214

(22) Filed: Sep. 22, 1999

(51) Int. Cl.[7] .................................................. H02J 7/00
(52) U.S. Cl. ....................................... 320/115; 439/310
(58) Field of Search ................................. 320/115, 107; 439/310, 337, 137, 138, 139, 140, 929, 131

(56) References Cited

U.S. PATENT DOCUMENTS 4,083,619 A * 4/1978 McCorkmick et al. ...... 439/310
4,436,792 A 3/1984 Tomino et al. ................ 429/1
4,588,938 A 5/1986 Liautaud et al. ............... 320/2
4,940,414 A * 7/1990 Lee ............................ 439/131
5,030,902 A * 7/1991 Mattinger ................... 320/114
5,716,730 A 2/1998 Deguchi ...................... 429/97

FOREIGN PATENT DOCUMENTS

DE 4331320 C2 9/1995 ......... H01R/33/955
JP 3-247058 11/1991
JP 63-36644 2/1998

* cited by examiner

*Primary Examiner*—Gregory J. Toatley, Jr.
(74) *Attorney, Agent, or Firm*—Priest & Goldstein, PLLC

(57) ABSTRACT

In a system for charging a rechargeable battery, an electrical device powered by a rechargeable battery has a body that fits into a receiving cavity in a charging base for recharging the battery. The electrical device is provided with a retractable charging terminal mechanism that causes a terminal leading to the rechargeable battery to protrude from the body of the electrical device to make contact with a recessed electrical contact in the base when the electrical device is seated in the base cavity and retracted back into the body of the electrical device when it is removed from the base cavity.

7 Claims, 5 Drawing Sheets

CHARGING MECHANISM FOR CORDLESS TELEPHONE AND OTHER ELECTRICAL DEVICES

BACKGROUND OF THE INVENTION

1. Field of the Invention

The present invention relates generally to improvements in portable electronic devices using rechargeable batteries, and particularly to advantageous aspects of a charging mechanism for use with cordless telephones and the like.

2. Description of the Prior Art

Most cordless telephone handset battery charging mechanisms contain spring metal parts protruding from a base unit, and make contact with corresponding handset metal pad when the handset is cradled in the base.

Charging a handset battery requires metal spring contacts protruding from a base and making contact to metal pads on the handset. The metal parts protruding from the charging base raise various concerns. For example, protruding contacts can be inadvertently contacted by a user, producing an electrical hazard or electrostatic discharge (ESD) problems. Protruding contacts may also present cosmetic issues, as they may be unattractive in appearance. Further, protruding contacts may become snagged in fabrics, articles of clothing, or the like.

SUMMARY OF THE INVENTION

The present invention provides a system for charging a rechargeable battery. According to one aspect of the invention, an electrical device powered by a rechargeable battery has a body that fits into a receiving cavity in a charging base for recharging the battery. The electrical device is provided with a retractable charging terminal mechanism that causes a terminal leading to the rechargeable battery to protrude from the body of the electrical device to make contact with a recessed electrical contact in the charging base when the electrical device is seated in the charging base cavity and retracted back into the body of the electrical device when it is removed from the base cavity.

Additional features and advantages of the present invention will become apparent by reference to the following detailed description and accompanying drawings.

BRIEF DESCRIPTION OF THE DRAWINGS

FIG. 2A shows a perspective view of the mechanism in which the charging posts are retracted. FIG. 2B shows a perspective view of the mechanism in which the charging posts are extended.

FIG. 4A shows the charging post in its retracted position, and FIG. 4B shows the charging post in its extended position.

DETAILED DESCRIPTION

One aspect of the invention provides for recessed charging contacts on both the cordless telephone handset, or other electrical device to be charged, and on the charging base. The use of recessed charging contacts limits the user's accessibility to these contacts, thereby preventing accidental touching of these contacts. The recessing of the electrical contacts is accomplished by providing spring-loaded metal probes or terminals mounted on the cordless telephone that protrude and make contact with recessed electrical contacts in the charging base only when the handset is cradled in the base. This provides safety and prevents accidental shock to the user as well as damage to the telephone from electrostatic discharge (ESD) (i.e., static electricity discharging into the handset through exposed electrical contacts), for example. Further, the recessed arrangement of the present invention eliminates the need for a transformer. Transformers are typically provided in base stations that have protruding charging contacts in order to provide isolation and in order to address the above-mentioned safety issues.

Figure 1:
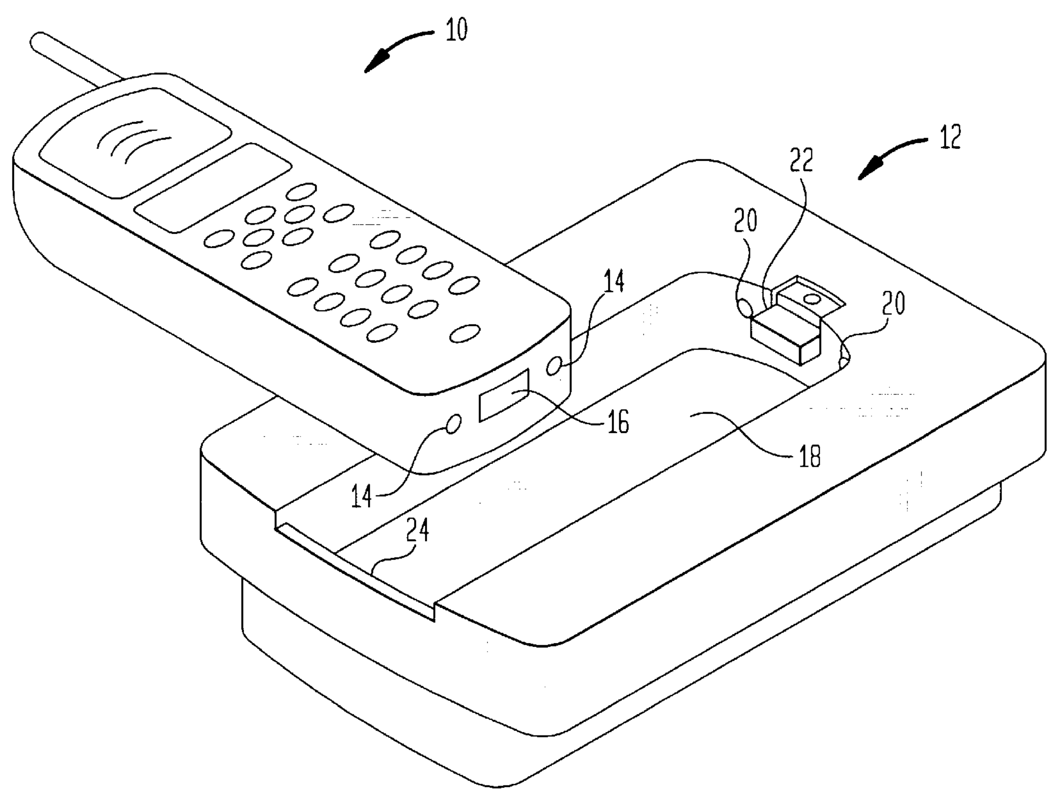
FIG. 1 shows a perspective view of a first embodiment of a cordless telephone charging system according to the present invention.

FIG. 1 shows a perspective view of a cordless telephone 10 and a charging base 12 according to the present invention. The cordless telephone 10 is powered by a rechargeable battery and has at its bottom a pair of spring-loaded, retractable posts 14 that provide an electrical contact to the battery for recharging. When the cordless telephone 10 is removed from the charging base 12, the charging posts 14 are retracted into the bottom of the cordless telephone 10. The bottom of the cordless telephone unit 10 further includes a pusher 16 located between the pair of charging posts 14. As shown and described below, when pusher 16 is pushed into the body of the telephone unit 10, this causes the retracted charging posts 14 to protrude outwards. When the pusher 16 is released, the spring-loading of the charging posts causes the posts to be retracted back into the body of the telephone unit 10.

The charging unit 12 includes a cavity 18 that is shaped to closely receive the telephone unit 10. One end of the cavity 18 includes a pair of recessed metal contacts 20, which provide electrical current to the portable telephone 10 for recharging its battery. The charging base 12 further includes a base hook projection 22. The metal contacts 20 and base hook projection 22 are positioned within the cavity 18 such that when the portable telephone unit 10 is properly seated within the cavity 18, the metal contacts 20 and base hook projection 22 are in alignment with the charging posts 14 and pusher 16 of the telephone unit. The base hook projection 22 is urged against the pusher 16, causing the charging posts to protrude into the recessed metal contacts 20, thus creating an electrical connection for charging purposes. The cavity 18 includes an upper lip 24 that grips the top edge of the telephone unit 10. This helps to seat the pusher 16 against the base hook projection 22.

The above-described system according to the present invention is advantageous over the prior art. In particular, the metal charging contacts 20 of the charging base 12 may be safely recessed deep enough within the body of the charging base 12 such that a human finger cannot reach in and accidentally touch either of the charging contacts 20. In addition, the retractable charging terminals 14 on the handset 10 are also retractable deep enough within the body of the handset 10 to prevent accidental contact.

It will be appreciated that it would be possible within the spirit of the present invention to place the retractable charging terminals 14 and pusher 16 on the charging base 12, and to place the recessed charging contacts 20 and base hook projection 22 on the handset 10. In such an embodiment of the invention, placing the handset 10 in the charging base 12 would urge the base hook projection 22 on the handset 10 to be urged against the pusher 16 on the charging base, causing charging terminals 14 to extend out of the body of the charging base 12 into the recessed charging contacts in the handset 10.

Figure 2A:
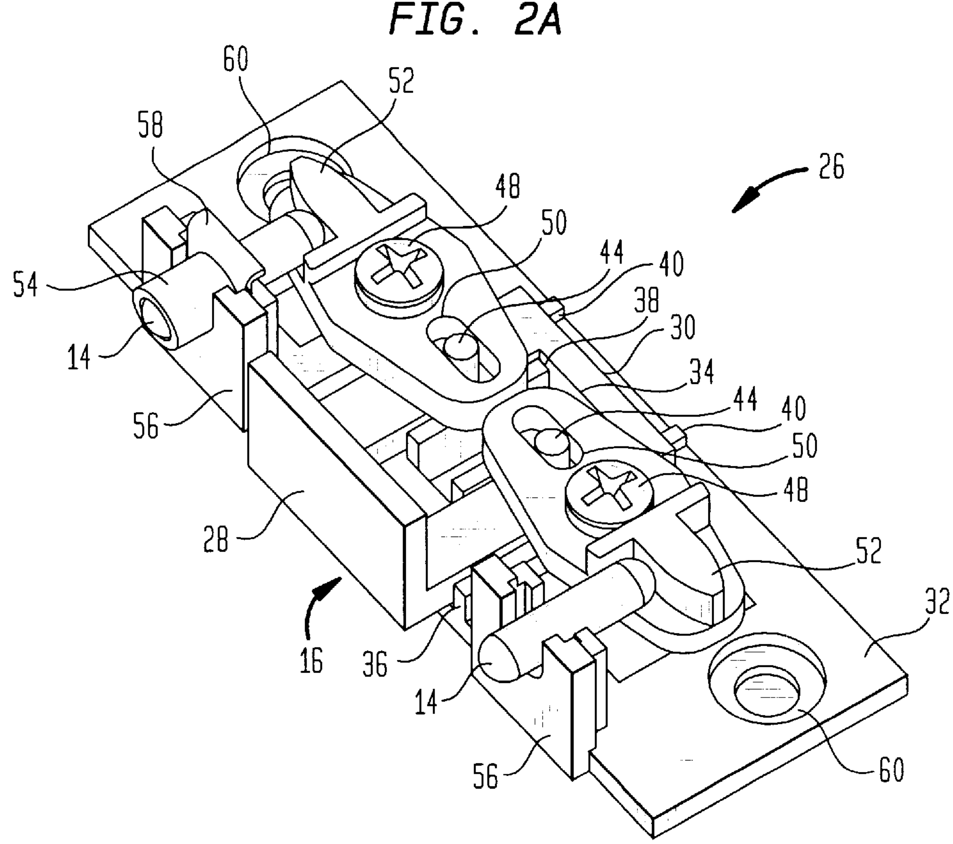
FIGS. 2A and 2B show perspective views of a first embodiment of a retractable charging post mechanism according to the present invention.
Figure 2B:
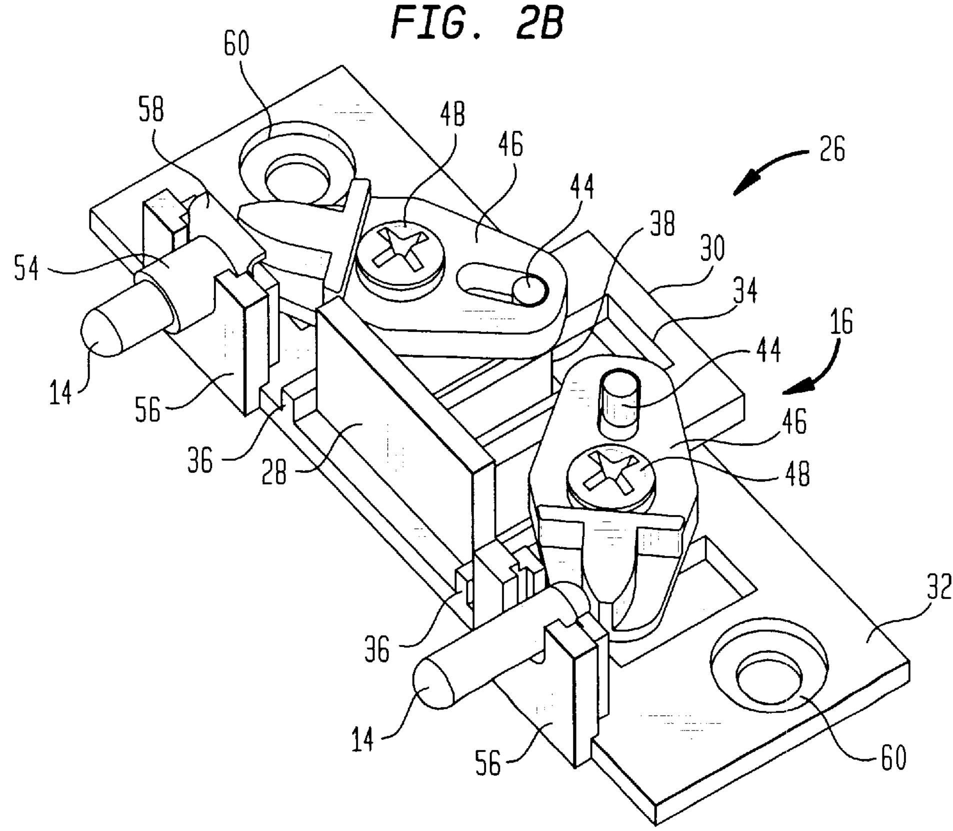
Figure 2C:
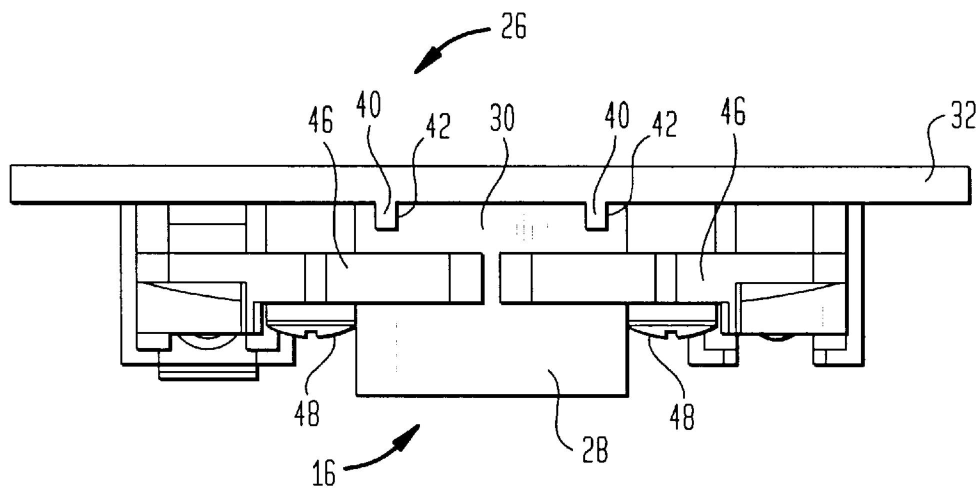
FIGS. 2C, 2D, 2E, and 2F show, respectively, top, front, bottom, and right side views of the retractable charging post mechanism shown in FIGS. 2A and 2B, with the charging posts in their retracted position.
Figure 2D:
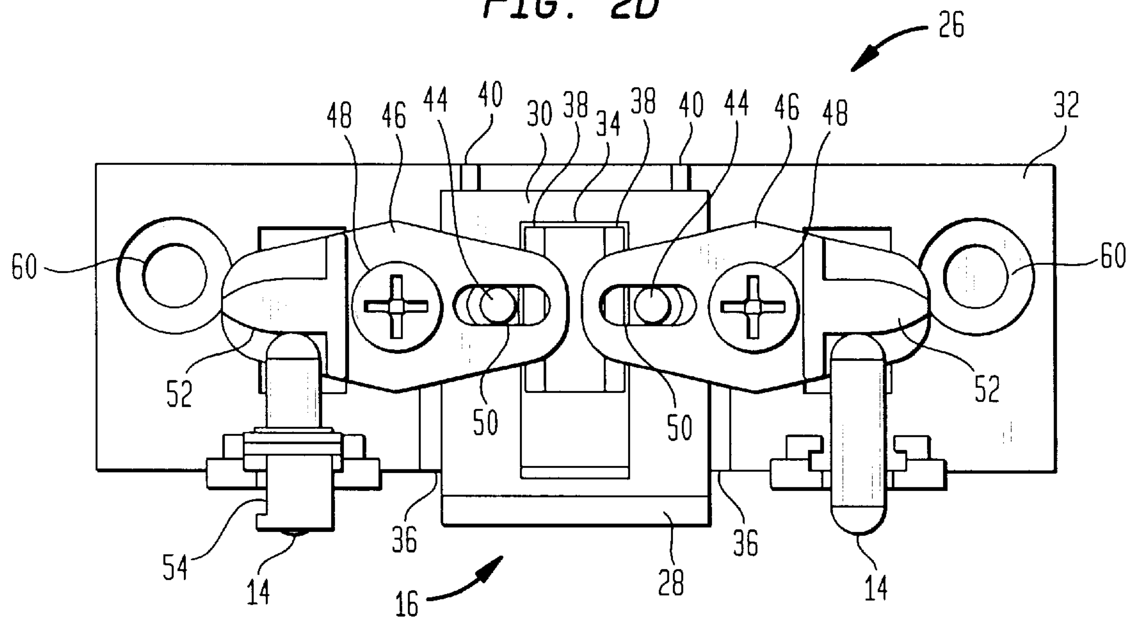
Figure 2E:
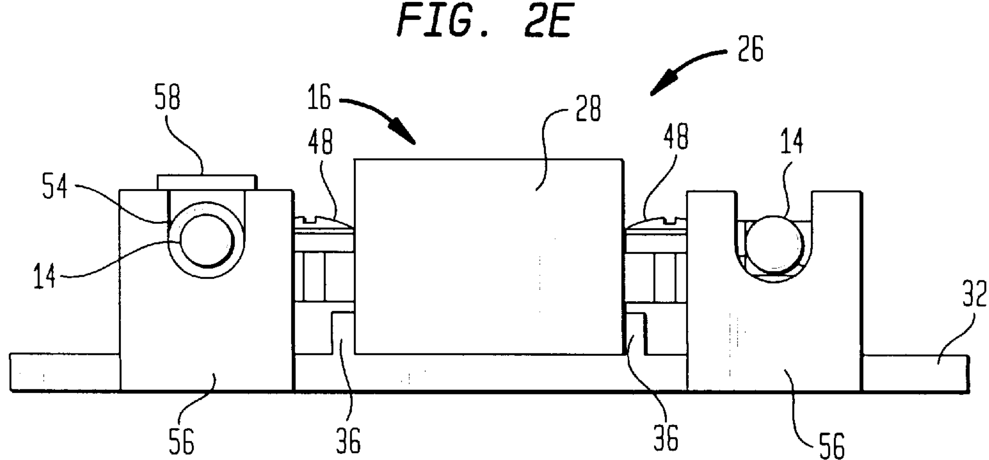
Figure 2F:
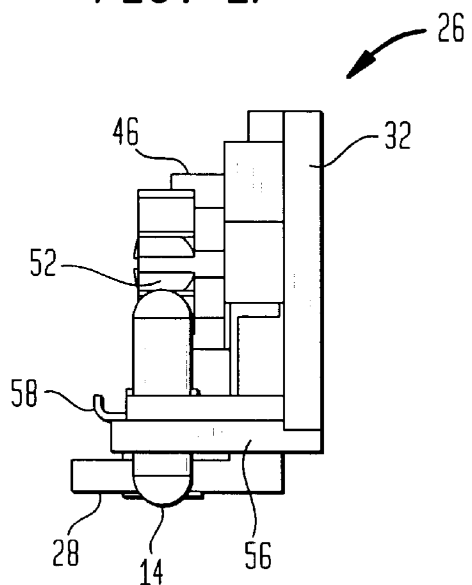

FIGS. 2A and 2B show perspective views of a retractable charging post mechanism 26 in accordance with the present invention. FIG. 2A shows the mechanism 26 in its retracted position, and FIG. 2B shows the mechanism 26 with the charging posts 14 at full extension. FIGS. 2C through 2F show, respectively, top, front, bottom, and right side views of the mechanism 26, with the charging posts 14 in their retracted position.

As discussed above, the charging posts 14 protrude from the mechanism 26 in response to pusher 16 being pushed in. In the present embodiment, the pusher 16 is provided by an L-shaped member, with the shorter leg of the "L" providing a pushing surface 28, and the rear surface of the longer leg of the "L" 30 being slidably mounted to the flat upper surface of a chassis 32. The longer leg of the "L" 30 includes a rectangular slot 34 which, as described below, is used to stabilize the motion of the pusher 16 as it slides back and forth on the surface of the chassis 32.

The movement of the pusher 16 is limited by three pairs of parallel guide rails 36, 38, 40, which protrude upwards from the chassis 32. An outer pair of guide rails 36 abuts the outside left and right edges of the longer leg of the "L" 30. An inner pair of guide rails 38 abuts the inner right and left edges of the rectangular slot 34. The inner pair of guide rails 38 and the rectangular slot 34 define the limits of the sliding movement of the pusher. When the charging posts 14 are retracted, as shown in FIG. 2A, the upper edge of the slot 34 butts up against the upper edge of the inner pair of guide rails 38. A third pair of guide rails 40 fits into corresponding parallel grooves 42, shown in FIG. 2C, running along the contact surface of the longer leg of the "L" member 30.

The pusher 16 further includes a pair of hinge posts 44 that extend upwards, perpendicular to the chassis 32. These hinge posts 44 are used to provide a mechanical connection between the pusher 16 and a pair of levers 46 that are used to push the charging posts 14 into their extended position.

The levers 46 are pivotably mounted to the chassis 32 by a pair of screws 48. The pivot screws 48 also serve to hold the pusher 16 in place underneath the levers 46. One end of each lever 46 has a slot 50 that fits over the hinge posts 44. As the pusher 16 is advanced into the body of the electrical device being charged, the hinge posts 44 move freely within the lever slots 50, as mechanically required. The other end of each lever 46 includes a T-shaped projection 52 that is used to provide a connection between each lever 46 and its corresponding charging post 14. The charging posts 14 are each mounted within a mounting sleeve 54, which is attached to the chassis 32 by a bracket 56. The mounting sleeves 54 include a conductive lead 58 that connects each charging post 14 to the device's rechargeable battery. For the purposes of illustration, only the left mounting sleeve 54, bracket 56, and conductive lead 58 are shown although, of course, the actual device would include a second set of these elements for the right charging post 14.

Each charging post 14 is spring loaded, urging each charging post 14 against its corresponding T-shaped member 52. The contact surface of each T-shaped member 52 is gently curved. This facilitates provides for a smooth pushing action, minimizing friction between the charging 14 posts and the contact surfaces of the T-shaped members 52. Finally, the chassis 32 includes a pair of screw holes 60 mounting the retractable charging post mechanism 26 into a cordless telephone or other electrical device.

In the present embodiment, each of the components of the retracting mechanism are fabricated from molded plastic, except for the charging posts 14 and the conductive leads 58, which are fabricated from metal.

Figure 3:
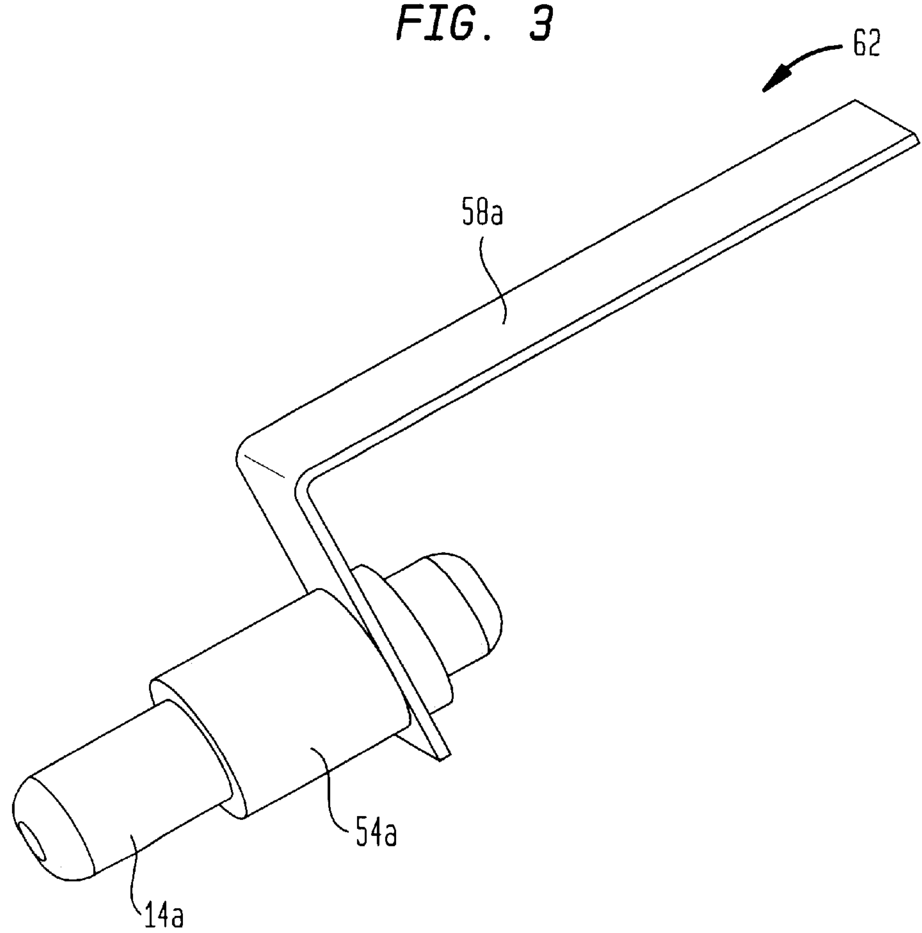
FIG. 3 shows a perspective view of an alternative embodiment of a retractable charging post subassembly according to the present invention.

FIG. 3 shows a perspective view of an alternative embodiment of a retractable charging post subassembly 62 showing a charging post 14 in its extended position within a mounting sleeve 54*a*. The conductive lead 58*a* in FIG. 3 is longer than the lead 58 shown in FIGS. 2A through 2F. The charging post 14*a* is spring-loaded within the mounting sleeve 54*a,* urging the charging post towards its retracted position.

Figure 4A:
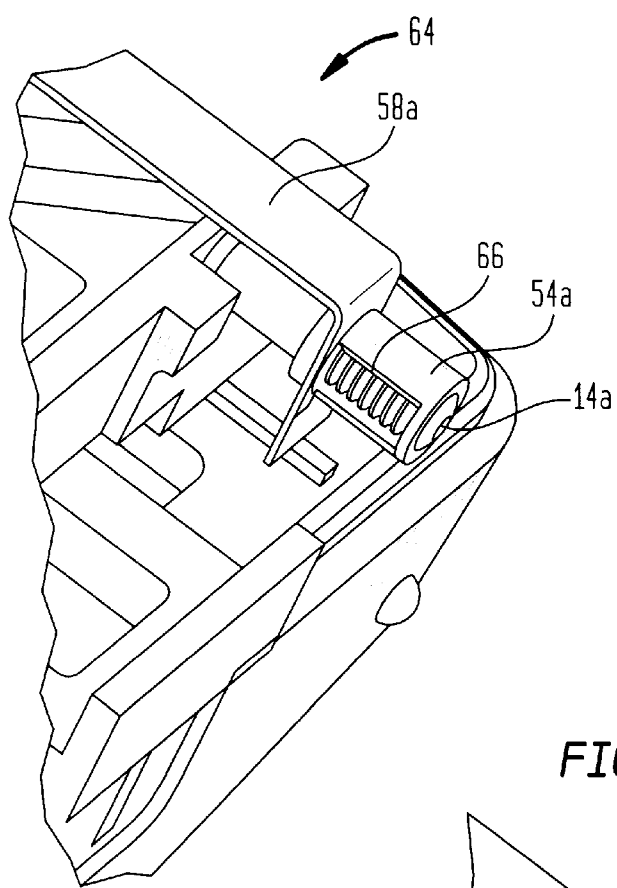
FIGS. 4A and 4B show cutaway perspective views of the retractable charging post subassembly shown in FIG. 3 mounted into an electrical device, such as the cordless telephone handset shown in FIG. 1.
Figure 4B:
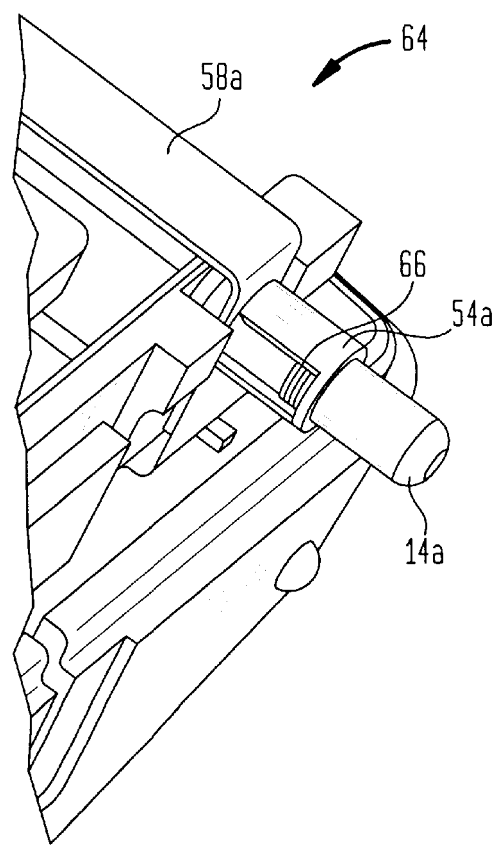

FIGS. 4A and 4B show cutaway perspective views of the charging post subassembly 62 mounted into an alternative embodiment of a retractable charging post mechanism 64. The retractable charging post mechanism is mounted into an electrical device, such as the cordless telephone handset 10 shown in FIG. 1. FIGS. 4A and 4B show the operation of the spring 66 used to spring-load the charging post 14*a* within the mounting sleeve 54*a*. When the charging post 14*a* is retracted, the spring 66 is partially compressed, thereby holding the charging post 14*a* in its retracted position. When the charging post 14*a* is extended out of the mounting sleeve 54*a,* the spring 66 becomes further compressed. Thus, when the pusher is released, the spring causes the charging post 14*a* to be pulled back into its mounting sleeve 54*a*.

While the foregoing description includes detail which will enable those skilled in the art to practice the invention, it should be recognized that the description is illustrative in nature and that many modifications and variations thereof will be apparent to those skilled in the art having the benefit of these teachings. It is accordingly intended that the invention herein be defined by the claims appended hereto and that the claims be interpreted as broadly as permitted by the prior art.

We claim:

1. A system for charging a rechargeable battery, comprising:

an electrical device powered by a rechargeable battery, the electrical device having a body that fits into a receiving cavity in a charging base for recharging the battery, the electrical device having a retractable charging terminal mechanism that causes a terminal leading to the rechargeable battery to protrude from the body of the electrical device to make contact with a recessed electrical contact in the base when the electrical device is seated in the base cavity and retracted back into the body of the electrical device when it is removed from the base cavity, the recessed electrical contact in the base and the electrical device's retractable charging terminal being recessed deeply enough within the base to prevent accidental touching of the electrical contact, the retractable charging terminal mechanism comprising a chassis and a pusher slidably mounted onto the chassis, the pusher having a pushing surface that is accessible from the exterior of the electrical device, the pusher being coupled to the charging terminal such that when the pusher is pushed into the body of the electrical device, the charging terminal is caused to protrude, the pusher comprising an L-shaped member having a first leg that provides a pushing surface perpendicular to the chassis, and a second leg lying on the chassis, the charging base having a projection that is urged against the pusher when the electrical device is seated in the receiving cavity of the charging base, causing the charging terminal to protrude to make contact with the recessed electrical contact in the base.

2. The system of claim 1, wherein the chassis includes a first pair of parallel guide rails disposed on either side of the second leg, thereby guiding the sliding motion of the pusher.

3. The system of claim 2, wherein the chassis includes a second pair of parallel guide rails disposed within a slot in the second leg, thereby guiding the sliding motion of the pusher.

4. The system of claim 3, wherein the chassis includes a third pair of parallel guide rails fitting into a corresponding pair of parallel grooves on the second leg, thereby guiding the sliding motion of the pusher.

5. A system for charging a rechargeable battery, comprising:

an electrical device powered by a rechargeable battery, the electrical device having a body that fits into a receiving cavity in a charging base for recharging the battery, the electrical device having a retractable charging terminal mechanism that causes a terminal leading to the rechargeable battery to protrude from the body of the electrical device to make contact with a recessed electrical contact in the base when the electrical device is seated in the base cavity and retracted back into the body of the electrical device when it is removed from the base cavity, the recessed electrical contact in the base and the electrical device's retractable charging terminal being recessed deeply enough within the base to prevent accidental touching of the electrical contact, the retractable charging terminal mechanism comprising a chassis and a pusher slidably mounted onto the chassis, the pusher having a pushing surface that is accessible from the exterior of the electrical device, the pusher being coupled to the charging projection such that when the pusher is pushed into the body of the electrical device, the charging terminal is caused to protrude, the retractable charging terminal mechanism further comprising a lever rotatably mounted to a pivot, the pusher and the charging terminal being coupled to the level on opposite sides of the pivot, such that when the pusher is pushed into the body of the electrical device, the lever causes the charging terminal to be pushed out of the electrical device, the lever being coupled to the pusher by a hinge post projecting from the pusher into a corresponding slot in the lever, the charging base having a projection that is urged against the pusher when the electrical device is seated in the receiving cavity of the charging base, causing the charging terminal to protrude to make contact with the recessed electrical contact in the base.

6. A system for charging a rechargeable battery, comprising:

an electrical device powered by a rechargeable battery, the electrical device having a body that fits into a receiving cavity in a charging base for recharging the battery, the electrical device having a retractable charging terminal mechanism that causes a terminal leading to the rechargeable battery to protrude from the body of the electrical device to make contact with a recessed electrical contact in the base when the electrical device is seated in the base cavity and retracted back into the body of the electrical device when it is removed from the base cavity, the recessed electrical contact in the base and the electrical device's retractable charging terminal being recessed deeply enough within the base to prevent accidental touching of the electrical contact, the retractable charging terminal mechanism comprising a chassis and a pusher slidably mounted onto the chassis, the pusher having a pushing surface that is accessible from the exterior of the electrical device, the pusher being coupled to the charging projection such that when the pusher is pushed into the body of the electrical device, the charging terminal is caused to protrude, the retractable charging terminal mechanism further comprising a lever rotatably mounted to a pivot, the pusher and the charging terminal being coupled to the level on opposite sides of the pivot, such that when the pusher is pushed into the body of the electrical device, the lever causes the charging terminal to be pushed out of the electrical device, the lever being coupled to the charging post of a T-shaped member projecting from the lever, the T-shaped member including a contact surface for making contact with the charging post, the charging base having a projection that is urged against the pusher when the electrical device is seated in the receiving cavity of the charging base, causing the charging terminal to protrude to make contact with the recessed electrical contact in the base.

7. The system of claim 6, wherein the contact surface of the T-shaped member is curved.

* * * * *